(12) United States Patent
Miglioranza

(10) Patent No.: US 8,143,849 B2
(45) Date of Patent: Mar. 27, 2012

(54) METHOD AND SYSTEM FOR RECHARGING A BATTERY POWER SUPPLY UNIT FOR A BICYCLE ELECTRONIC DEVICE

(75) Inventor: Federico Miglioranza, Schio (IT)

(73) Assignee: Campagnolo S.r.l., Vicenza (IT)

( * ) Notice: Subject to any disclaimer, the term of this patent is extended or adjusted under 35 U.S.C. 154(b) by 644 days.

(21) Appl. No.: 11/781,475

(22) Filed: Jul. 23, 2007

(65) Prior Publication Data

US 2008/0048611 A1 Feb. 28, 2008

(30) Foreign Application Priority Data

Jul. 24, 2006 (IT) .............................. MI2006A1438

(51) Int. Cl.
H02J 7/00 (2006.01)
(52) U.S. Cl. ..................... 320/114; 320/107; 320/111
(58) Field of Classification Search ................. 320/107, 320/114
See application file for complete search history.

(56) References Cited

U.S. PATENT DOCUMENTS

| | | | | |
|---|---|---|---|---|
| 4,380,727 | A | | 4/1983 | Gray |
| 5,872,445 | A | | 2/1999 | Ozawa et al. |
| 5,929,602 | A | | 7/1999 | Suzuki |
| 6,051,955 | A | * | 4/2000 | Saeki et al. .................... 320/121 |
| 6,150,794 | A | * | 11/2000 | Yamada et al. ................ 320/108 |
| 6,634,896 | B1 | | 10/2003 | Potega |
| 2001/0000284 | A1 | * | 4/2001 | Whittaker ...................... 180/220 |
| 2002/0017895 | A1 | | 2/2002 | Kawashima |
| 2002/0158608 | A1 | * | 10/2002 | Miyoshi ......................... 320/162 |
| 2004/0004463 | A1 | | 1/2004 | Young et al. |
| 2004/0095092 | A1 | * | 5/2004 | Ta-Shuo |
| 2004/0201365 | A1 | * | 10/2004 | Dasgupta et al. .............. 320/116 |
| 2005/0048330 | A1 | * | 3/2005 | Ozeki et al. ...................... 429/15 |
| 2005/0116687 | A1 | | 6/2005 | Yokomizo et al. |
| 2005/0140335 | A1 | | 6/2005 | Lee et al. |
| 2005/0156567 | A1 | * | 7/2005 | Guderzo ....................... 320/118 |
| 2005/0156603 | A1 | | 7/2005 | Lin et al. |
| 2008/0116845 | A1 | * | 5/2008 | Sonnenschein et al. ...... 320/107 |

FOREIGN PATENT DOCUMENTS

| | | |
|---|---|---|
| DE | 3135380 A1 | 3/1983 |
| DE | 8511242 U1 | 6/1985 |
| DE | 3446689 A1 | 7/1986 |
| DE | 19731955 C1 | 12/1998 |
| DE | 20217730 U1 | 2/2003 |
| DE | 202006003061 U1 | 6/2006 |
| EP | 0645868 A2 | 3/1995 |
| EP | 0992811 A2 | 4/2000 |
| EP | 1244192 A2 | 9/2002 |
| EP | 1357678 A1 | 10/2003 |
| EP | 1557926 A1 | 7/2005 |
| GB | 2161040 A | 1/1986 |
| WO | 8101274 A1 | 5/1981 |
| WO | 0203524 A1 | 1/2002 |

* cited by examiner

*Primary Examiner* — Arun Williams
(74) *Attorney, Agent, or Firm* — Volpe and Koenig P.C.

(57) ABSTRACT

A method and system for recharging a battery power supply unit is provided. During the recharging of a battery power supply unit for a bicycle electronic device, the power supply unit is electrically disconnected from the electronic device and receives recharging energy from a first power supply circuit of a battery charger. The battery charger comprises a second power supply circuit which, during the recharging of the battery power supply unit, supplies the electronic device. In such a manner, the first power supply circuit is intended only for recharging the battery power unit and the recharging is hence optimized.

38 Claims, 10 Drawing Sheets

METHOD AND SYSTEM FOR RECHARGING A BATTERY POWER SUPPLY UNIT FOR A BICYCLE ELECTRONIC DEVICE

FIELD OF INVENTION

The present description relates to a method and system for charging a battery power supply unit of an electronic device, in particular in an electronic apparatus mounted on a bicycle.

BACKGROUND

Electronic apparatuses mounted on bicycles, for example, for controlling the electronic gearshift and/or for acquiring, displaying, and controlling riding parameters and various functions, provide for the use of a power supply unit.

The power supply unit typically consists of one or more batteries, typically connected in series, also referred to as a battery pack. The batteries used for such electronic devices are typically of the rechargeable type.

In the known apparatuses, in order to recharge the power supply unit without removing it from the electronic apparatus, a recharging device or battery charger is used which provides electrical energy from an external energy source, such as, for example, a conventional electrical outlet, in parallel to the power supply unit and to the electrical and electronic components of an electronic device intended, for example, for controlling and actuating an electronic gearshift and/or for acquiring, displaying, and controlling bicycle riding parameters and other functions, including interfacing with the cyclist.

The current supplied by the battery charger is therefore the sum of the recharge current which supplies the rechargeable battery power supply unit and the current which supplies the electronic device.

Consequently, it is not possible to effectively monitor the recharge current intensity supplied to the battery power supply unit, for example, in order to carry out the recharging through two controlled steps, i.e., an initial constant current step and a final constant voltage step.

The technical problem at the basis of the present invention is to allow an effective control of the recharge voltage and current in order to allow an optimal recharging of the battery power supply unit.

SUMMARY

During the recharging of a battery power supply unit for a bicycle electronic device, the power supply unit is electrically disconnected from the electronic device and receives recharging energy from a first power supply circuit of a battery charger. The battery charger comprises a second power supply circuit which, during the recharging of the battery power supply unit, supplies the electronic device. In such a manner, the first power supply circuit is intended only for recharging the battery power unit and the recharging is hence optimized.

BRIEF DESCRIPTION OF THE DRAWING(S)

The invention shall now be better described with reference to embodiments thereof, illustrated merely as not limiting examples in the attached drawings, wherein.

DETAILED DESCRIPTION OF THE PREFERRED EMBODIMENT(S)

Introduction

Figure 1:
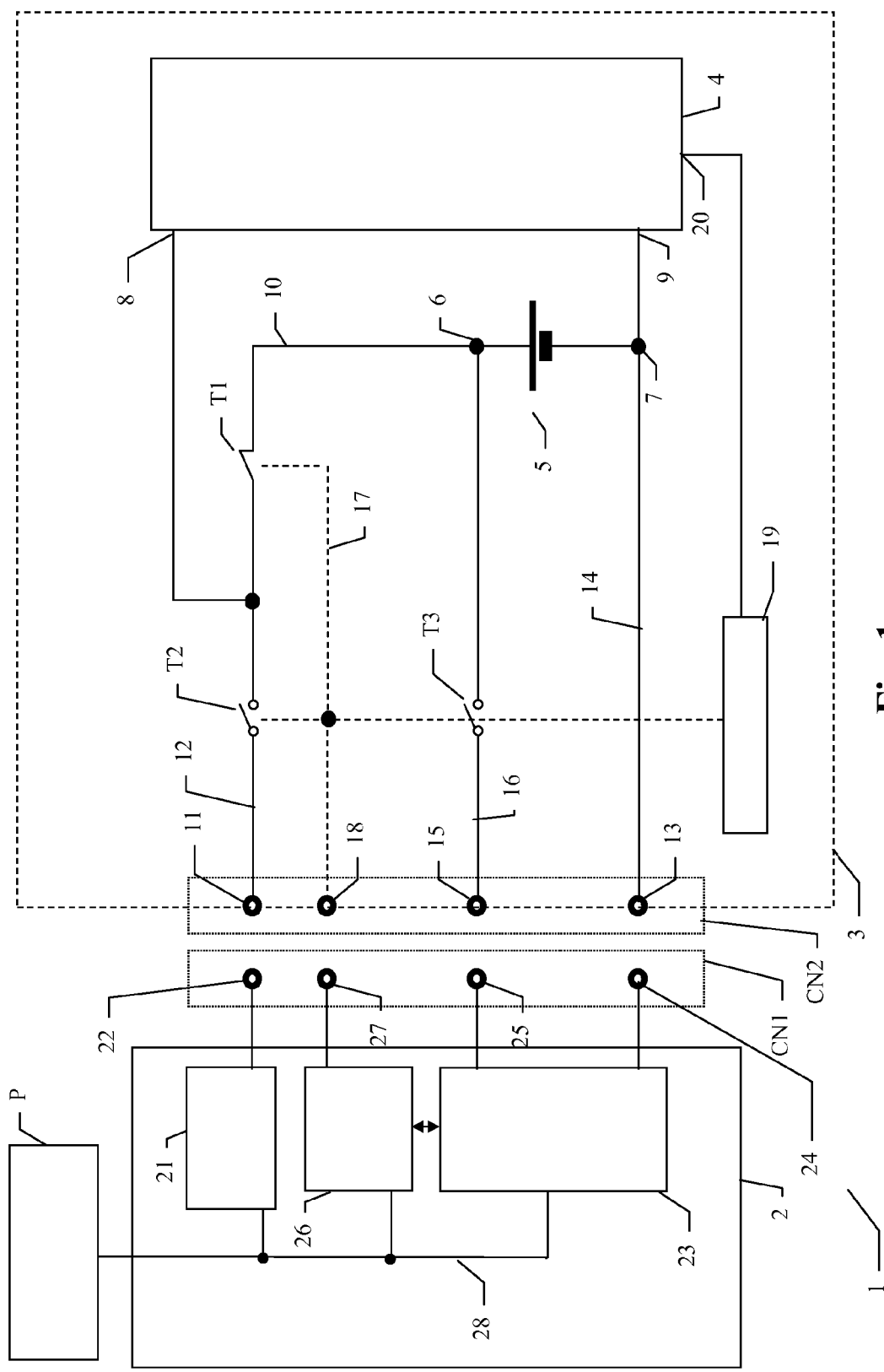
FIG. 1 is a block diagram of a first embodiment of the system of the invention, in a first operating configuration.

According to the invention, the above-described problem is solved by supplying electrical energy from an external energy source simultaneously and independently to the battery power supply unit and to the electronic device by means of two power supply circuits of a battery charger.

In a first aspect thereof, the invention regards a method for recharging a battery supply unit for a bicycle electronic device, comprising the steps of providing electrical energy from an external source to the battery power supply unit and simultaneously and independently providing electrical energy from the external source to the electronic device.

In a second aspect thereof, the invention regards a bicycle electronic system comprising an electronic device, a rechargeable battery power supply unit and a battery charger having an input for connection with an external energy source, a power supply circuit and a charge circuit, the system having an operating configuration wherein the power supply circuit of the battery charger supplies power to the electronic device and the charge circuit of the battery charger charges the power supply unit.

Typically, the system has a further operating configuration wherein the battery power supply unit supplies power to the electronic device.

Typically, in the further operating configuration, the battery charger is electrically disconnected from the battery power supply unit and from the electronic device, and is preferably also mechanically disconnected from a casing housing the battery power supply unit and the electronic device.

In particular, the system of the invention comprises a switch on a power supply line between the electronic device and the battery power supply unit for switching between the operating configuration and the further operating configuration.

Preferably, the switch is of the normally closed type and is driven open in the operating configuration wherein the power supply circuit of the battery charger supplies power to the electronic device and the charge circuit of the battery charger charges the power supply unit.

Preferably, the system further comprises at least one switch for insulating the power supply lines from the battery charger to the electronic device and/or to the battery power supply unit.

More preferably, the at least one insulating switch is of the normally open type and is driven close in the operating configuration wherein the power supply circuit of the battery charger supplies power to the electronic device and the charge circuit of the battery charger charges the power supply unit. In such a manner, the switch is automatically effective for insulating the lines when the battery charger is disconnected from the on-board electronic apparatus and the lines arrive at terminals of a pair of multipolar connectors.

Preferably, a logic unit is further provided for driving a commutating switch and/or the at least one insulating switch, which is more preferably part of the battery charger.

Preferably, moreover, the system comprises a protection circuit suitable for interrupting the power supply to the electronic device by the battery power supply unit in the further operating configuration in case the delivered current or at least one voltage of the power supply unit falls outside a respective range of predetermined values.

Preferably, moreover, a sensor indicates to the electronic device that the system is in the operating configuration, wherein the power supply circuit of the battery charger supplies power to the electronic device and the charge circuit of the battery charger charges the power supply unit.

When the battery power supply unit comprises a plurality of battery elements, typically connected in series, the charge circuit of the battery charger comprises a corresponding plurality of subcircuits for independently recharging each battery element.

The rechargeable battery power supply unit can be disconnectable from the electronic device.

In a third aspect thereof, the invention regards a battery charger having an input for connection with an external energy source and a removable connector for connection with an on-board electronic apparatus for a bicycle, a power supply circuit, and a charge circuit, the circuits simultaneously and independently providing a voltage for supplying an electronic device of the on-board electronic apparatus and a predetermined voltage or current for charging a battery power supply unit of the on-board electronic apparatus at the terminals of the connector.

As discussed above, the battery charger can comprise a logic unit suitable for providing at a terminal of the connector a signal for driving operating configuration switching means of the on-board electronic apparatus.

Alternatively or additionally, the battery charger can comprise switches for insulating the terminals of the connector and/or a sensor for detecting a recharging operating condition of the battery power supply unit.

In a fourth aspect thereof, the invention regards a bicycle electronic apparatus, comprising:
  at least one electronic device having a first and a second power supply input,
  a rechargeable battery power supply unit having a first pole and a second pole,
  a connection of the first input of the electronic device switchable between the first pole of the battery power supply unit and a first terminal of a removable connector for connection with a battery charger,
  a connection of the second input of the electronic device to the second pole of the battery power supply unit and to a second terminal of the connector, and
  a connection of the first pole of the battery power supply unit to a third terminal of the connector.

In a fifth aspect thereof, the invention regards an electronic device having:
  a first and a second power supply input,
  a connection of the first input switchable between a first terminal suitable for connection with a first pole of a battery power supply unit and a first terminal of a removable connector for connection with a battery charger,
  a connection of the second input to a second terminal suitable for connection with a second pole of the battery power supply unit and to a second terminal of the connector, and
  a connection of the first terminal, suitable for connection with the first pole of the battery power supply unit, with a third terminal of the connector.

DETAILED DESCRIPTION

The block diagram of a first embodiment of a system of the invention is shown in FIG. 1.

The system 1 comprises a battery charger 2 which can be connected to an external energy source P—such as the 110V or 220V conventional electrical outlet or an automobile battery by means of the cigarette lighter socket of the automobile—and an on-board electronic apparatus 3.

The battery charger 2 is provided with a multipolar connector CN1 which can be connected/disconnected with a corresponding multipolar connector CN2 of the electronic apparatus 3.

The electronic apparatus 3 comprises an electronic device 4 and a related rechargeable battery power supply unit 5, typically housed within a common casing indicated with the same reference number 3. The power supply unit 5 could, however, be removed from the electronic device 4, and/or housed in a separate casing.

The electronic device 4 comprises the electrical and electronic components intended, for example, for controlling and actuating an electronic gearshift and/or for acquiring, displaying, and controlling riding parameters of the bicycle and other functions, including interfacing with the cyclist.

The power supply unit 5 is represented as a single battery element, but it is understood that it could be comprised of a plurality of battery elements connected in series so as to provide a predetermined voltage difference Vsup between a first pole 6 and a second pole 7. In the case of three batteries connected in series, Vsup may be, e.g., about 12 volts.

The voltage difference Vsup corresponds with the voltage difference necessary for supplying the electronic device 4, between a first input 8 and a second input 9 thereof.

The first input 8 of the electronic device 4 is selectively connectable to the first pole 6 of the battery power supply unit 5 by means of a connection 10 provided with a normally closed switch T1.

The first input 8 of the electronic device 4 is moreover connected with a first terminal 11 of the multipolar connector CN2 by means of a connection 12. The connection 12 can optionally be provided with a normally open switch T2 for insulating the first terminal 11 of the connector CN2 when the connector CN2 is not connected to the connector CN1 of the battery charger 2.

The second input 9 of the electronic device 4 and the second pole 7 of the battery power supply unit 5 are connected with each other and with a second terminal 13 of the connector CN2 by means of a connection 14.

The first pole 6 of the power supply unit 5 is moreover connected with a third terminal 15 of the connector CN2 by means of a connection 16. The connection 16 may optionally be provided with a normally open switch T3 for insulating the third terminal of the connector CN2 when the connector CN2 is not connected to the connector CN1 of the battery charger 2.

The switch T1 and the switches T2 and T3 when provided for are preferably driven by a signal on a common driving line 17, leading to a fourth terminal 18 of the connector CN2. The switches T1, T2, and T3 preferably consist of MOSFETs (metal-oxide-semiconductor field-effect transistors), but could also consist of, for example, other types of transistors, or even relays.

The electronic apparatus 3 moreover preferably comprises a sensor 19 suitable to detect the presence of the signal along the driving line 17 and to provide the related information to an input 20 of the electronic device 4.

The battery charger 2 comprises a power supply circuit 21 suitable to provide a predetermined voltage (e.g., about 4 volts) to a first terminal 22 of the multipolar connector CN1.

The power supply circuit 21 is so designed that the voltage difference between the first terminal 22 and a reference voltage is equal to the voltage Vsup necessary for supplying the electronic device 4. Preferably, the reference voltage is the ground voltage and the first terminal 22 is kept at voltage Vsup.

The battery charger 2 moreover comprises a charge circuit or cell 23—for example, of the linear- or switching-type—connected with a second terminal 24 and with a third terminal 25 of connector CN1.

The charge cell 23 is preferably so designed as to establish a predetermined current (e.g., 700-800 mA) and/or a predetermined voltage difference (e.g., 4.25 volts) between the terminals 24 and 25, suitable to recharge the battery power supply unit 5, as will be clear hereinafter. Preferably, the second terminal 24 is kept at the aforesaid reference voltage, in particular at ground voltage.

Alternatively, the reference voltage could be provided by the power supply circuit 21.

In particular, the charge cell 23 is so designed that, when the battery power supply unit 5 is charged, the voltage difference between the first terminal 22 and the second terminal 24 of connector CN1 is equal to the voltage Vsup necessary for supplying the electronic device 4.

The battery charger 2 moreover preferably comprises a logic unit 26 whose output is connected with a fourth terminal 27 of the connector CN1. The logic unit 26 provides a signal suitable to drive the normally closed switch T1 of the electronic apparatus 3 open, and to drive the normally open switches T2, T3 of the electronic apparatus 3, when provided for, closed.

The power supply circuit 21, the charge cell 23, and the logic unit 26, when provided for, are supplied by the external energy source P through a power supply line 28. Use of one or more power supply/regulator circuits of a known type can be provided, interposed between the external energy source P and the power supply circuit 21, the charge cell 23, and the logic unit 26, when provided for.

In a first operating configuration of the system 1, shown in FIG. 1, the battery charger 2 is electrically disconnected from the electronic apparatus 3; in particular, the multipolar connectors CN1 and CN2 are disconnected.

In such a configuration, the battery charger is not operating and may or may not be connected with the external energy source P (in case it is also mechanically disconnected from the on-board electronic apparatus 3). Alternatively, the battery charger could remain on the bicycle, mechanically connected with the on-board electronic device 3.

The drive signal is not present on the driving line 17 and, thus, switch T1 is closed. The electronic device 4 is hence supplied with power, between the two power supply inputs 8 and 9, by the voltage Vsup of the battery power supply unit 5.

Switches T2 and T3, when provided for, are open so as to better insulate the first and the third terminal 11, 15 of connector CN2. Alternatively, other means of insulation could be provided for, such as a removable cover for the connector CN2 in an electrically insulating material, preferably watertight.

Figure 2:
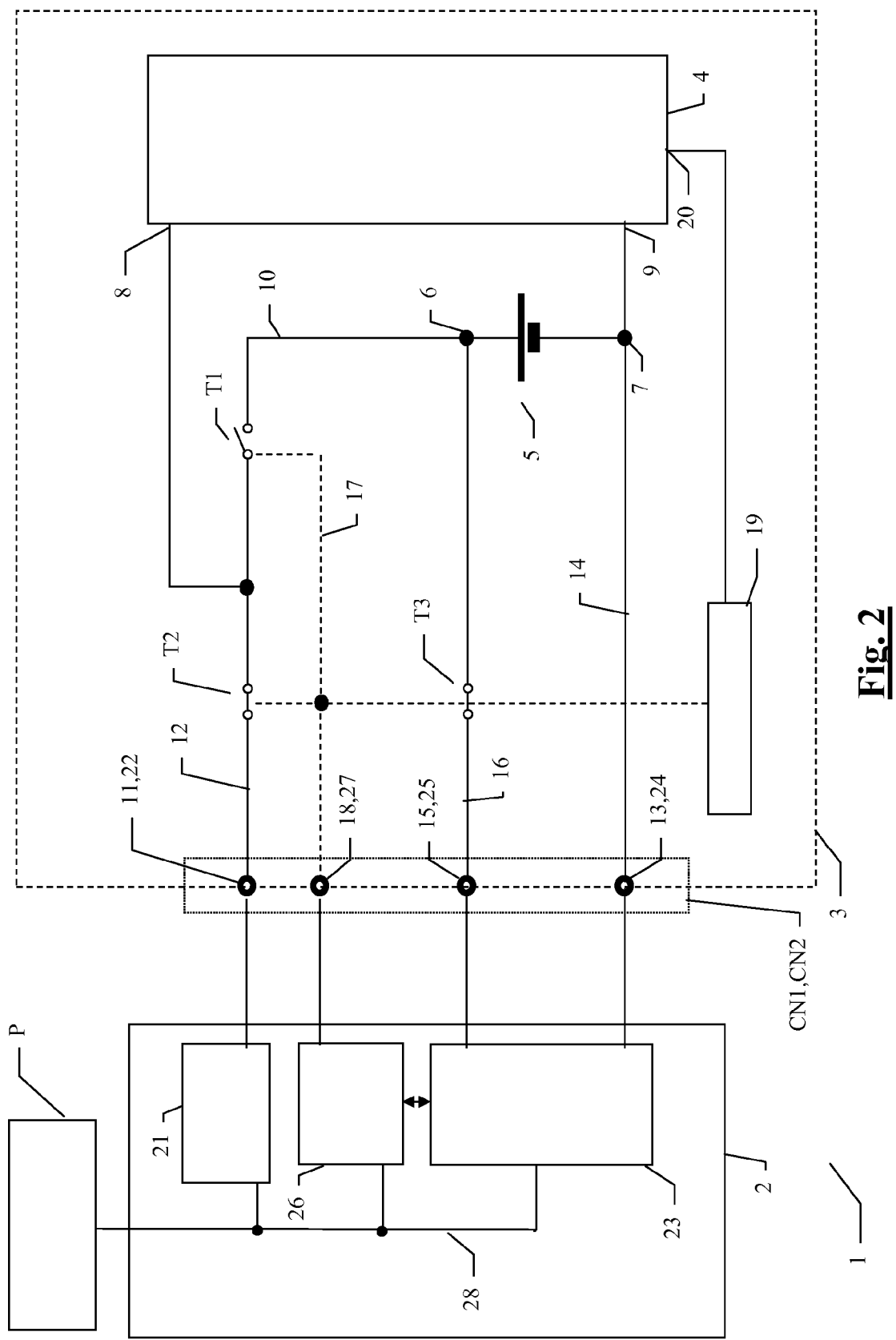
FIG. 2 is a block diagram of the first embodiment of the system of the invention, in a second operating configuration.

In a second operating configuration of the system 1, shown in FIG. 2, the battery charger 2 is connected with the electronic apparatus 3; in particular, the multipolar connectors CN1 and CN2 are connected, the respective terminals from the first to the fourth 11, 13, 15, 18, and 22, 24, 25, 27 corresponding. In such a configuration, the battery charger is connected with the external energy source P.

The logic unit 26 generates the drive signal on the driving line 17, by means of the fourth terminals 27 and 18, and hence the switch T1 is open. The drive signal can be a signal derived directly from the voltage along the power supply line 28 of the battery charger 2, if necessary appropriately adapted to the voltage level necessary for the type of switch T1 employed—and for switches T2, T3 when provided for. In this case, the drive signal is present at the fourth terminal 27 of the battery charger 2 as soon as the latter is connected with the external source P. Alternatively, the drive signal could be generated by the logic control unit 26 according to other criteria, for example, only upon detection of the connection between the battery charger 2 and the electronic apparatus 3 by means of proximity sensors or other means.

Since switch T1 is open, and switch T2, when provided for, is closed, between the two power supply inputs 8 and 9 of the electronic device 4 there is the voltage Vsup provided by the battery charger 2 and, in particular, by the power supply circuit 21 between the first terminals 22, 11 and the second terminals 24, 13.

Moreover, since switch T1 is open and switch T3, when provided for, is closed, the poles 6 and 7 of the battery power supply unit 5 are connected with the second terminals 24, 13 and with the third terminals 25, 15, and therefore the battery power supply unit 5 is connected with the charge cell 23 of the battery charger 2 and is recharged.

It should be noted that the charge cell 23 is exclusively connected with the battery power supply unit 5, and it does not, in parallel, supply the electronic device 4. In particular, the voltage at the terminals 24, 25 of the charge cell 23 coincides with the voltage at the poles 6, 7 of the battery power supply unit 5, and the current delivered by the recharge cell 23 coincides with the recharge current of the battery power supply unit 5. The recharging of the battery power supply unit 5 by the recharge cell 23 can therefore occur in an optimal manner, since the correct monitoring and controlling of the voltage and current recharging parameters are made possible.

At the same time, the power supply circuit 21 supplies the electronic device 4, permitting its functioning during the recharging of the battery power supply unit 5. The electronic device 4 can therefore be used for carrying out other operations such as, for example, operations of setting the parameters of the computer cycle, adjusting the end positions of the derailleurs, or any other operation which can be carried out with the bicycle stationary, under recharge.

The electronic device 4 recognizes that the power supply unit 5 is recharging through detection of the signal at input 20, connected with sensor 19. Such a signal can directly consist of the drive signal on the driving line 17, preferably and appropriately adapted to the logic voltage levels provided for the input 20 of the electronic device 4. In this case, sensor 19 can, for example, consist of a resistive divider.

The information for the electronic device 4, that the battery power supply unit 5 is recharging, can be useful for possible controls by the electronic device 4, such as, for example, monitoring the recharging time. Nevertheless, sensor 19 is optional.

Switches T1 and T2 could moreover be replaced by a toggle switch which selectively connects the first input 8 of the electronic device 4 to the first pole 6 of the battery power supply unit 5, or to the first terminal 11 of connector CN2.

Figure 3:
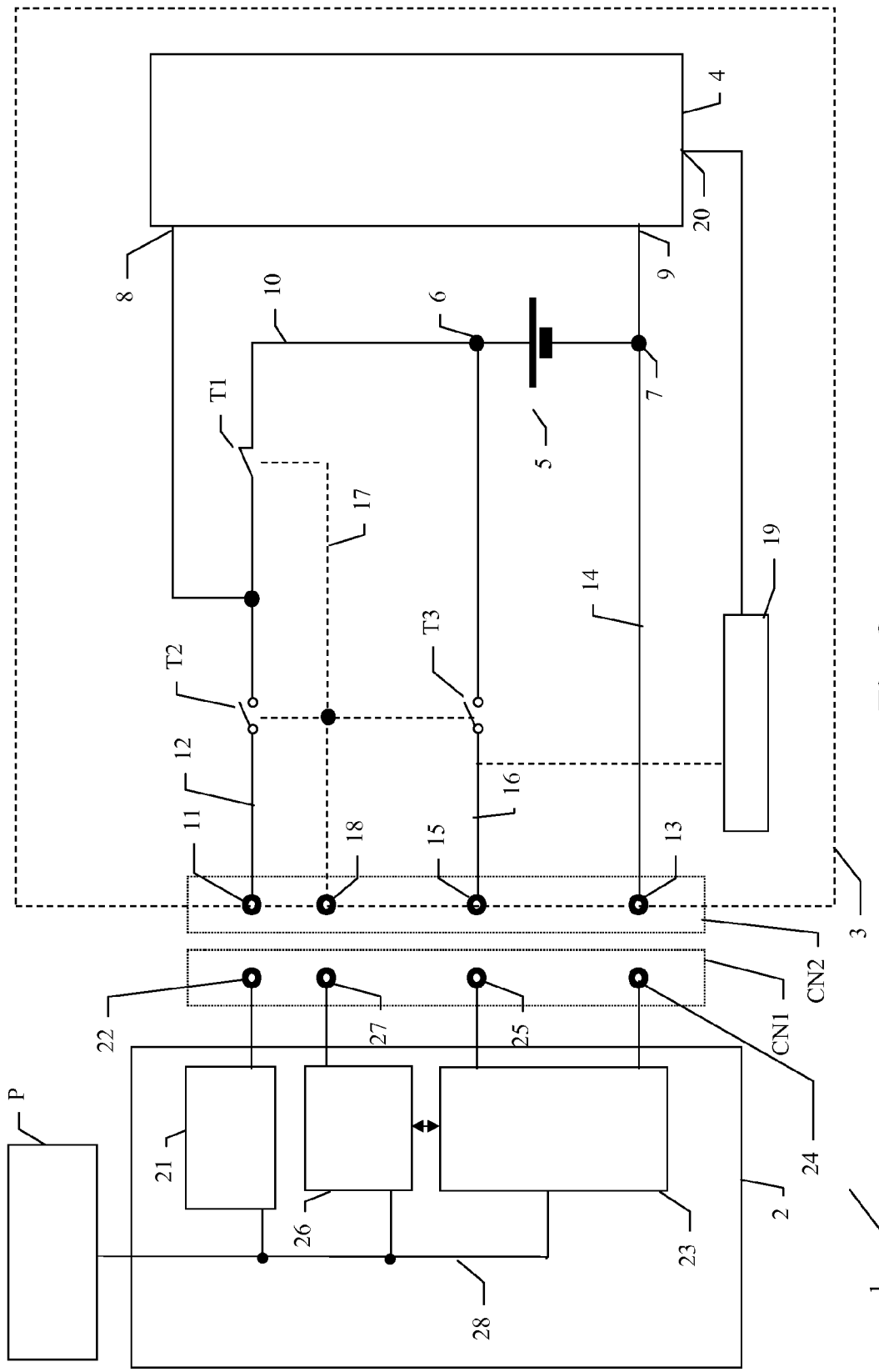
FIG. 3 is a block diagram of a second embodiment of the system of the invention.

The block diagram of a second embodiment of a system of the invention is shown in FIG. 3. Such an embodiment differs from that shown in FIG. 1 in that sensor 19 detects the voltage on the connection 16 between the first pole 6 of the battery power supply unit 5 and the third terminal 15 of the connector CN2, upstream of the normally open switch T3. When the battery charger 2 is not connected with the on-board electronic device 3, as shown in FIG. 3, sensor 19 does not detect any stable voltage upstream of switch T3. When the battery charger 2 is connected with the electronic apparatus 3, analogous to what is shown in FIG. 2, the voltage upstream of switch T3 corresponds with the voltage of the power supply terminal 25 of the recharge cell 23 and, therefore, sensor 19 detects the value thereof and makes the information available at the input 20 of the electronic device 4. The electronic device 4 therefore receives more detailed information, which can be used, for example, for monitoring the voltage progression of the recharging of the battery power supply unit 5.

Figure 4:
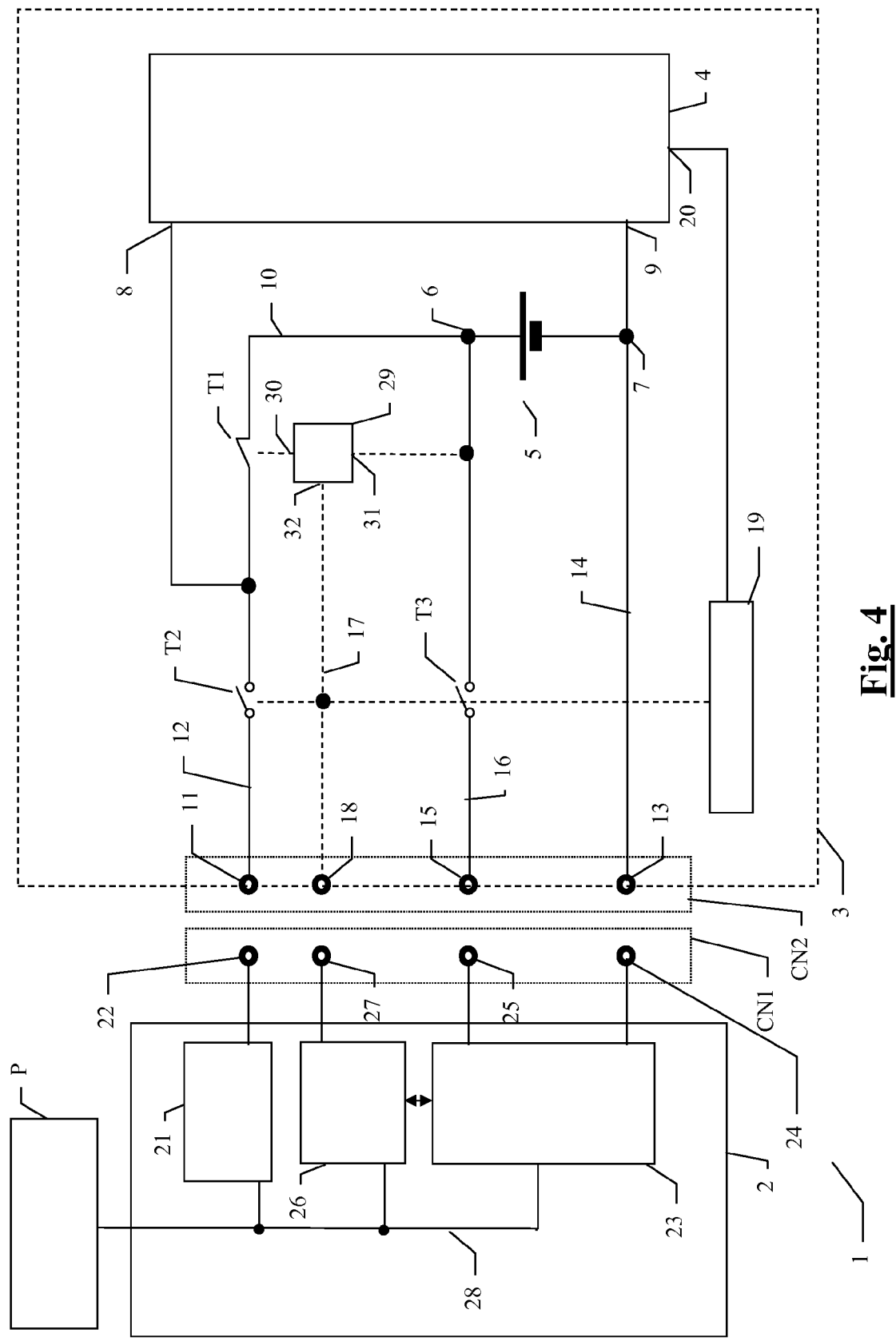
FIG. 4 is a block diagram of a third embodiment of the system of the invention.

The block diagram of a third embodiment of a system of the invention is shown in FIG. 4. Such an embodiment differs from that shown in FIG. 1 in the presence of a protection circuit, e.g., an integrated circuit known as Single Cell Battery Protection Circuit.

The protection circuit 29 drives the opening of the normally closed switch T1 through a control output 30 based on the voltage value detected at a monitoring input 31 connected with the first pole 6 of the battery power supply unit 5, or based on the current flowing through switch T1. A control input 32 of the protection circuit 29 is connected with the driving line 17.

The protection circuit 29 is capable of detecting the voltage at the first pole 6 of the battery power supply unit 5 through the input 31, and the current delivered by the battery power supply unit 5 through control of the current through the switch T1 which the protection circuit 29 itself drives. With the system in the operating configuration of FIG. 4, wherein the battery power supply unit 5 supplies the electronic device 4, the protection circuit 29 intervenes to open the normally closed switch T1 when the voltage or the current of the battery power supply unit 5 falls outside predetermined values. For example, the protection circuit 29 opens the switch T1 when the current delivered by the battery power supply unit 5 is too high (e.g., Imax=5 A), or opens the switch T1 when the voltage at the first pole 6 of the battery power supply unit 5 is too low (e.g., Vmin=2.8 volts).

When, instead, the system 1 is in the operating configuration with the battery charger 2 connected with the on-board electronic apparatus 3, analogous to what is shown in FIG. 2, the protection circuit 29 detects the presence of the battery charger 2 by means of the control input 32, and keeps the normally closed switch T1 constantly open.

Figure 5:
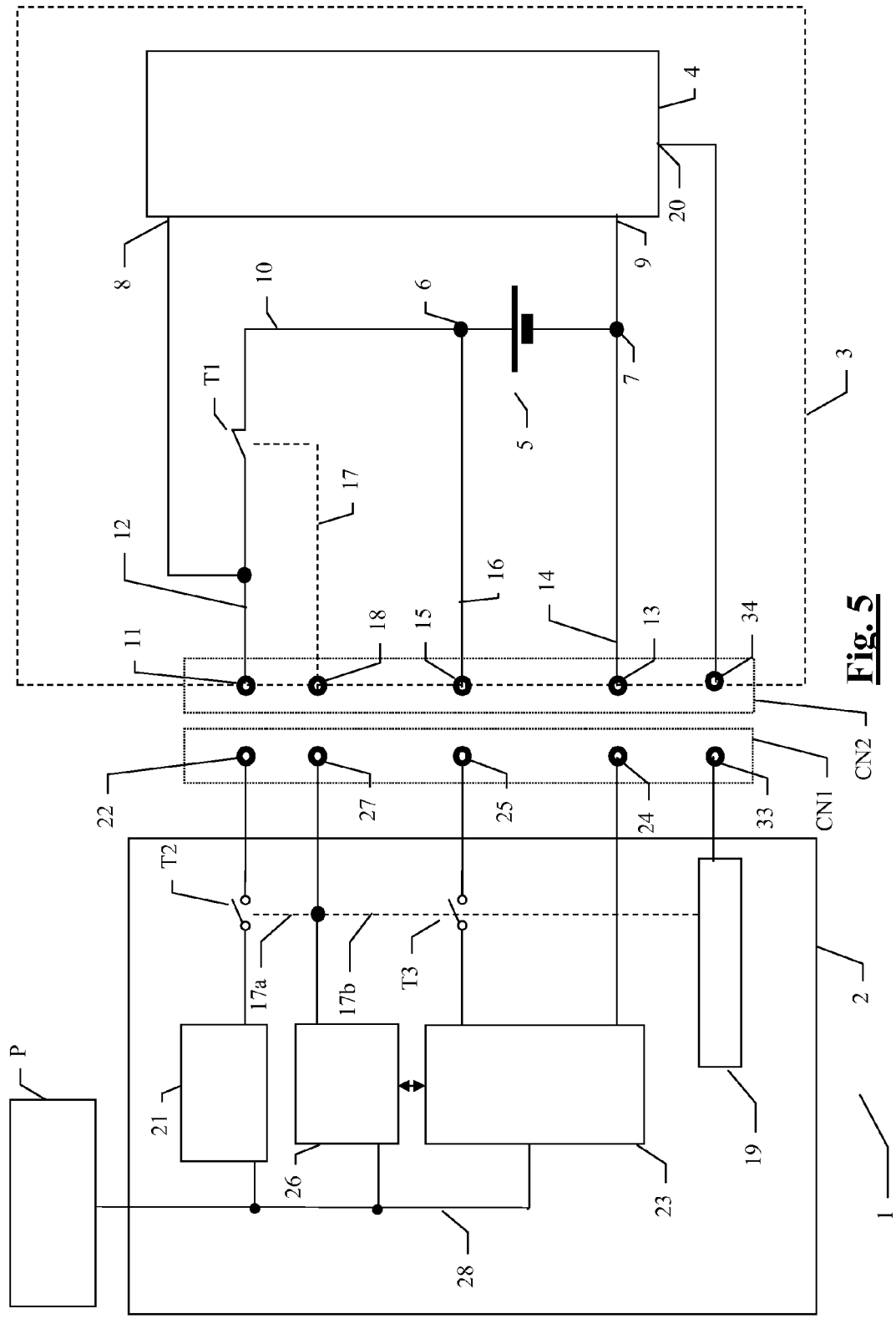
FIG. 5 is a block diagram of a fourth embodiment of the system of the invention, in a first operating configuration.

The block diagram of a fourth embodiment of a system of the invention is shown in FIG. 5. Such an embodiment differs from that shown in FIG. 1 in the normally open switch T2 between the first input 8 of the electronic device 4 and the power supply circuit 21 of the battery charger 2, and the normally open switch T3 between the first pole 6 of the battery power supply unit 5 and the charge cell 23 are provided on the side of the battery charger 2 instead of on the side of the on-board electronic apparatus 3. The logic unit 26 drives the normally open switches T2 and T3 by means of driving lines 17a, 17b inside the battery charger 2, and it drives the normally closed switch T1 by means of the fourth terminals 27, 18 and the driving line 17.

Moreover, sensor 19 is also on the side of the battery charger 2 and its output is sent to the input 20 of the electronic device 4 by means of a pair of fifth terminals 33, 34, of the two multipolar connectors CN1, CN2 respectively.

In the first operating configuration shown in FIG. 5, the battery charger 2 is disconnected from the electronic apparatus 3. Switch T1 is closed and the electronic device 4 is supplied by the voltage Vsup of the battery power supply unit 5. Switches T2 and T3 are open so as to better insulate the first and the third terminal 22, 25 of the connector CN1.

Figure 6:
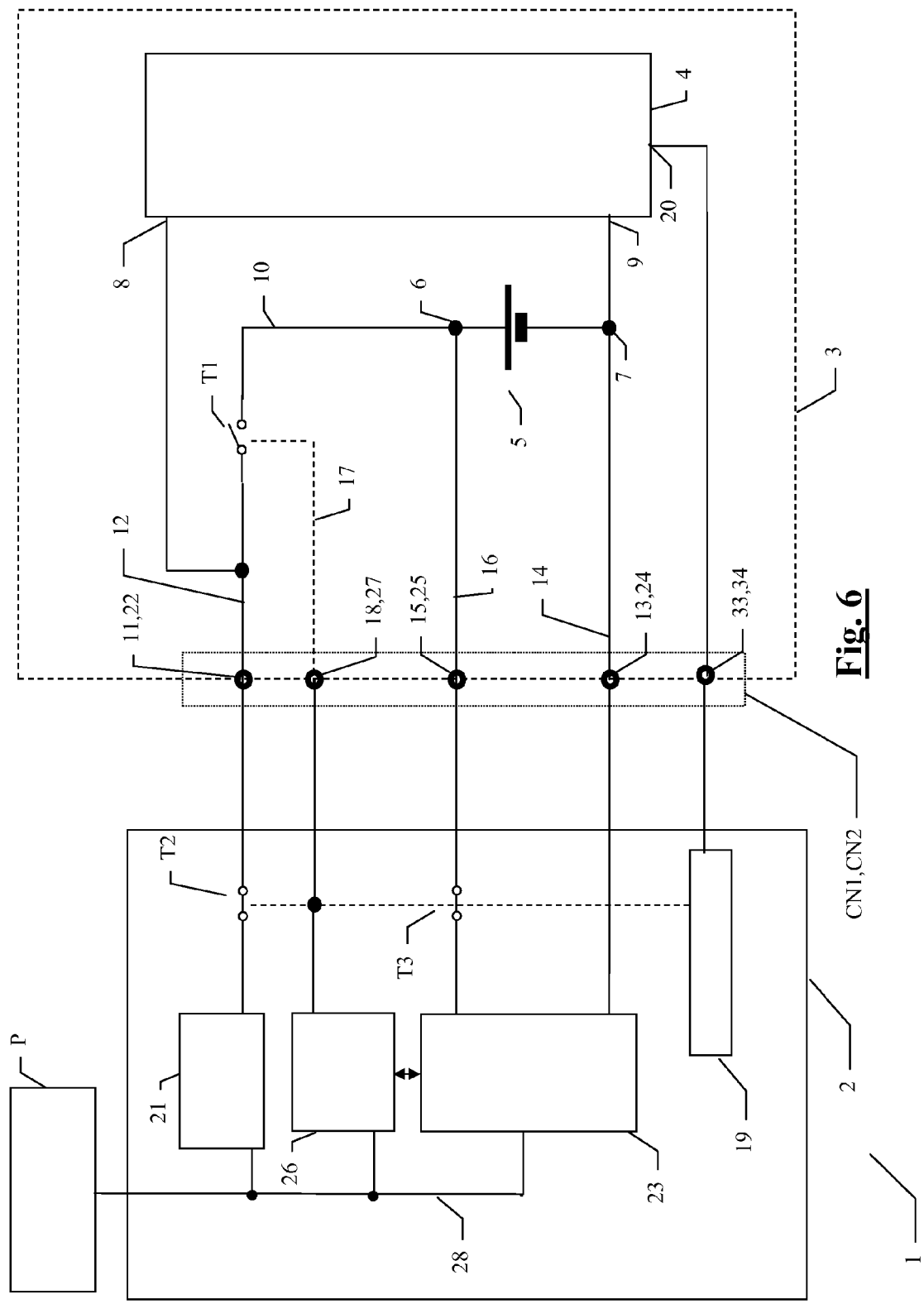
FIG. 6 is a block diagram of the fourth embodiment of the system of the invention, in a second operating configuration.

In the second operating configuration shown in FIG. 6, the battery charger 2 is connected with the external energy source P and with the electronic apparatus 3; in particular, the multipolar connectors CN1 and CN2 are connected, the respective terminals from the first to the fifth 11, 13, 15, 18, 33, and 22, 24, 25, 27, 34 corresponding.

The logic unit 26 generates the drive signal and, therefore, switch T1 is open and switch T2 is closed. The electronic device 4 is supplied with the voltage Vsup provided by the power supply circuit 21 of the battery charger 2 and can, for example, monitor the recharging time in addition to being usable for carrying out any operation.

Moreover, since switch T1 is open and switch T3 is closed, the charge cell 23 of the battery charger exclusively supplies the battery power supply unit 5, hence recharging it in an optimal manner.

Figure 7:
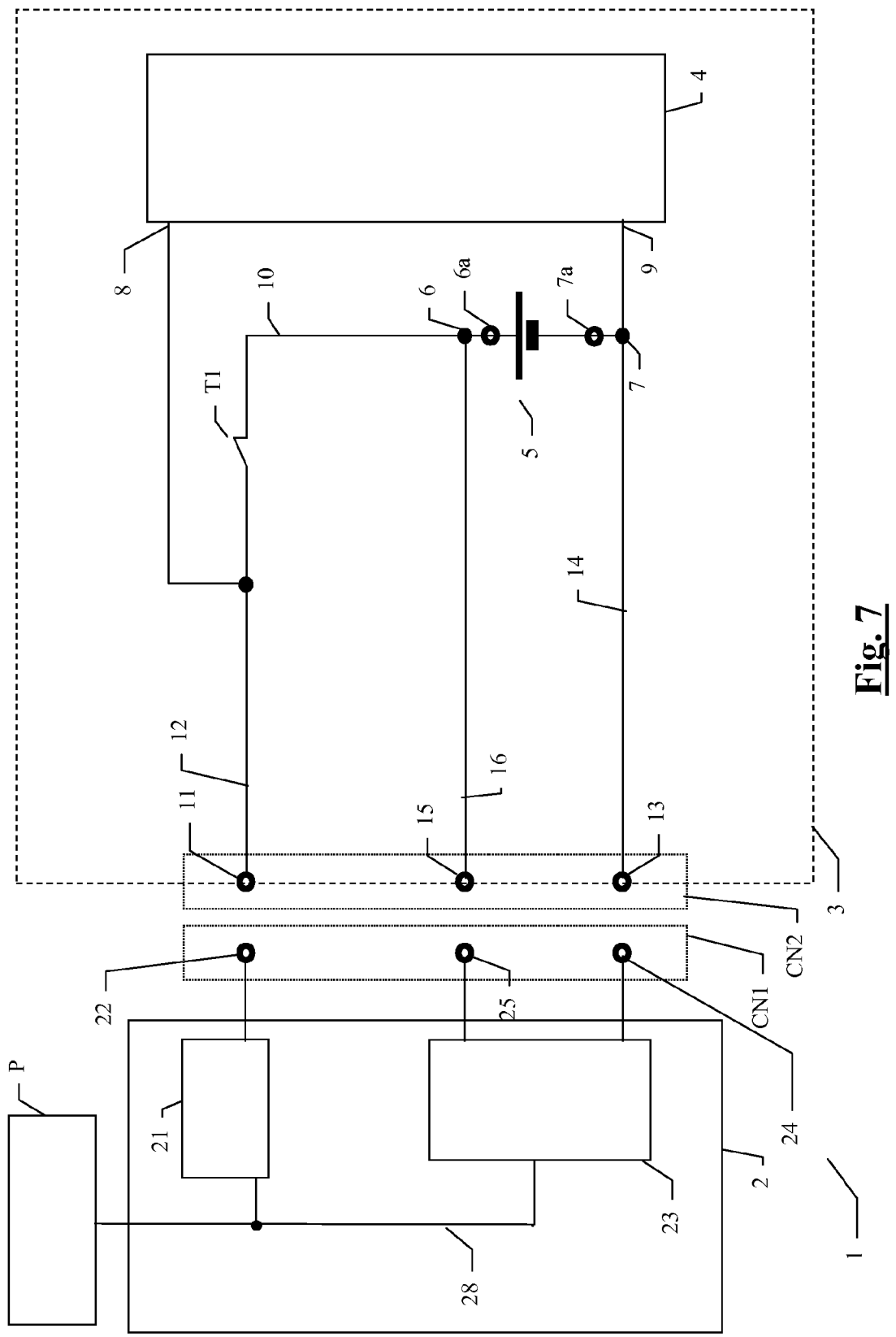
FIG. 7 is a block diagram of a fifth embodiment of the system of the invention.

As mentioned, the protection normally open switches T2, T3, the logic unit 26, and the charging sensor 19 are optional. In FIG. 7, the block diagram of an embodiment of a system 1 of the invention without such elements is shown.

In FIG. 7, removable contacts 6a, 7a are also shown for connection between the battery power supply unit 5 and the electronic device 4. The battery power supply unit 5 is therefore removable from the on-board apparatus 3, and could be housed in a casing separate from the casing of the electronic device 4. It is moreover understood that this is also applicable in the previously described embodiments.

It is moreover understood that, as an alternative, there may be protection normally open switches both on the side of the on-board electronic apparatus 3 and on the side of the battery charger 2. As mentioned, the battery power supply unit 5 can comprise a plurality of battery elements connected in series in order to provide the predetermined voltage difference Vsup (e.g., about 12 volts) between the first pole 6 and the second pole 7. (For example, three batteries just upon full charge reach 4.2 volts each, namely 12.6 volts.) In such a case, it may be preferable to individually recharge the single battery elements.

Figure 8:
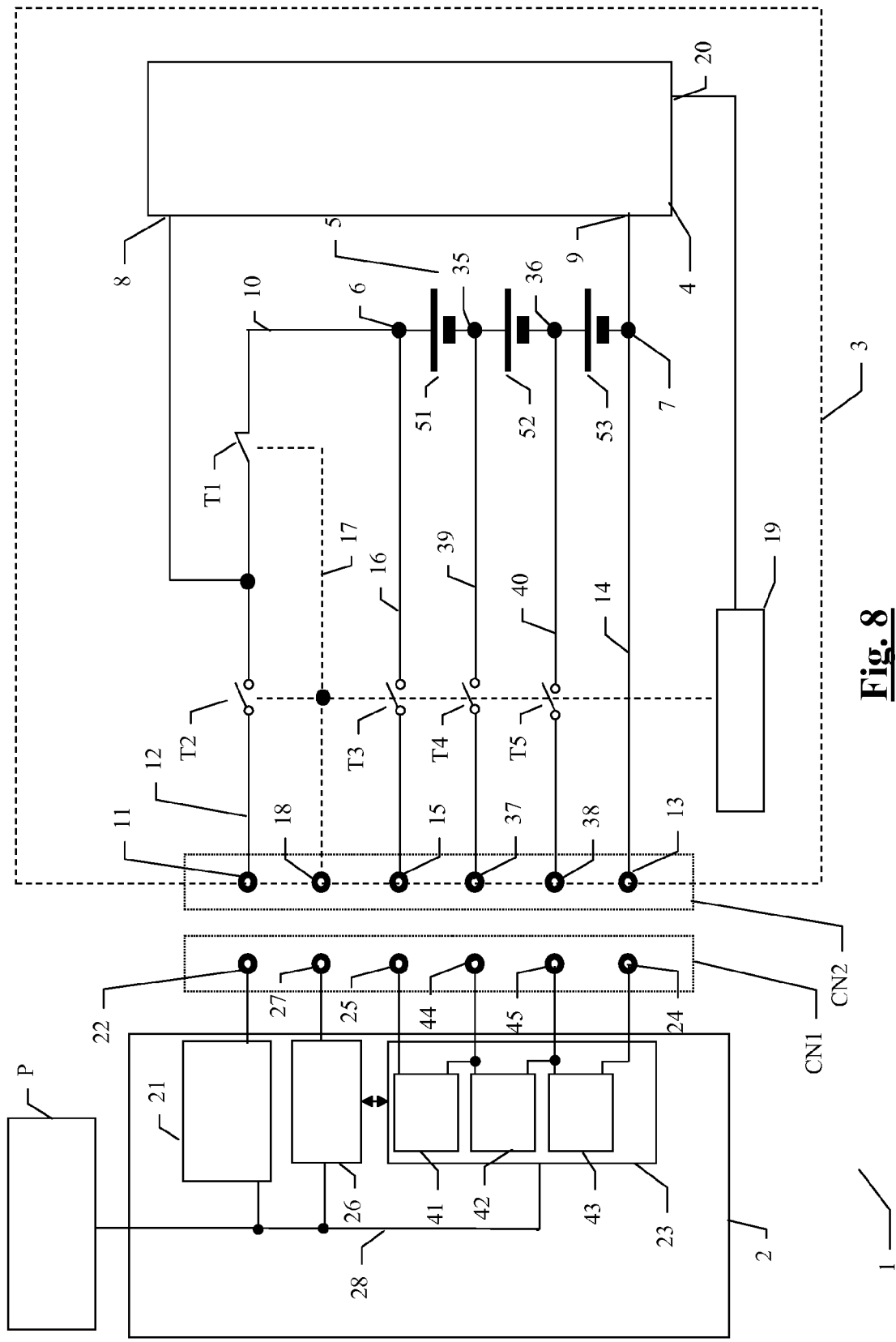
FIG. 8 is a block diagram of a sixth embodiment of the system of the invention.

The block diagram of an embodiment of a system 1 of the invention, wherein the battery power supply unit 5 comprises, as an example, three battery elements 51, 52, 53 connected in series, is illustrated in FIG. 8.

The common poles of the battery elements 51, 52 and 52, 53 are referred to with reference numbers 35 and 36.

In addition to what has been described above with reference to FIG. 1, in the multipolar connector CN2, a fifth terminal 37 and a sixth terminal 38 are provided for leading to the common poles 35 and 36, respectively, by means of connections 39 and 40, respectively. The connections 39, 40 are preferably, though optionally, equipped with normally open switches T4 and T5, respectively, in order to better insulate the terminals 37 and 38 in the operating configuration of FIG. 8.

The charge circuit 23 of the battery charger 2 comprises three charge cells 41, 42, 43. Such charge cells provide the levels of voltage and current necessary for recharging the three battery elements 51, 52, 53. In particular, the third charge cell 43 is connected with the second terminal 24 of the connector CN1, to which it preferably provides the ground or reference voltage, and the first charge cell 41 is connected with the third terminal 25 of the connector CN1, which has a suitable voltage, depending on the type of recharging utilized. In particular, when the second terminal 24 of the connector CN1 is kept grounded, the third terminal 26 of connector CN1 is at the power supply voltage Vsup upon completion of the battery power supply unit 5 charging. The first and the second charge cells 41, 42 are moreover connected with a fifth terminal 44 of the connector CN1, to which they provide a first intermediate voltage, typically equal to Vsup*2/3 upon charge completion, and the second and the third charge cells 42, 43 are moreover connected with a sixth terminal 45 of the connector CN1, to which they provide a second intermediate voltage, typically equal to Vsup/3 upon charge completion. In at least one step of the charge cycle, the charge cells 41, 42, 43 could moreover establish a constant current within the battery elements 51, 52, 53. Also in this case, the battery charger 2 could comprise power supply/regulator circuits along the power supply line 28.

In the first operating configuration shown in FIG. 8, the battery charger 2 is disconnected from the electronic apparatus 3. Switch T1 is closed and the electronic device 4 is supplied by the voltage Vsup of the battery power supply unit 5. Switches T2, T3, T4, T5, when provided for, are open so as to better insulate the first, the third, the fifth, and the sixth terminal 22, 25, 44, 45 of connector CN1.

Figure 9:
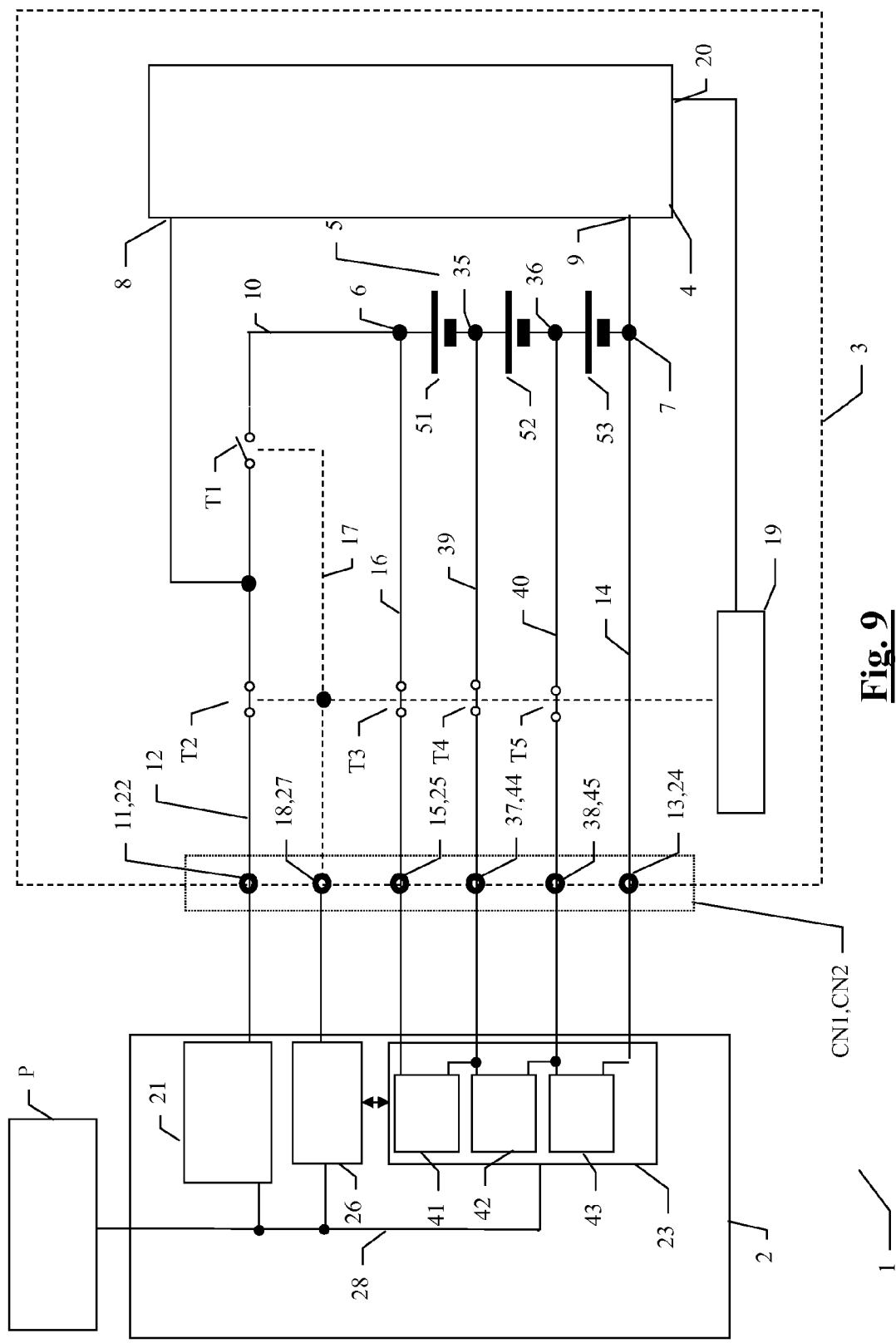
FIG. 9 is a block diagram of the sixth embodiment of the system of the invention, in a second operating configuration.

In the second operating configuration shown in FIG. 9, the battery charger 2 is connected with the external energy source P and with the electronic apparatus 3; in particular, the multipolar connectors CN1 and CN2 are connected, the respective terminals from the first to the sixth 11, 13, 15, 18, 37, 38, and 22, 24, 25, 27, 44, 45 corresponding.

The logic unit 26 generates the drive signal and, therefore, switch T1 is open and switch T2 is closed. The electronic device 4 is supplied with the voltage Vsup provided by the power supply circuit 21 of the battery charger 2 and can, for example, monitor the recharge time in addition to being usable for carrying out any operation.

Moreover, since switch T1 is open and switches T3, T4, T5, when provided for, are closed, the three charge cells 41, 42, 43 of the charge circuit 23 of the battery charger 2 exclusively supply the battery power supply unit 5, each recharging one of the three battery elements 51, 52, 53 in an optimal manner.

Also in the case of a battery power supply unit 5 comprising more battery elements 51, 52, 53 connected in series, the above described variants and alternatives described with reference to FIG. 1-7 are possible.

Figure 10:
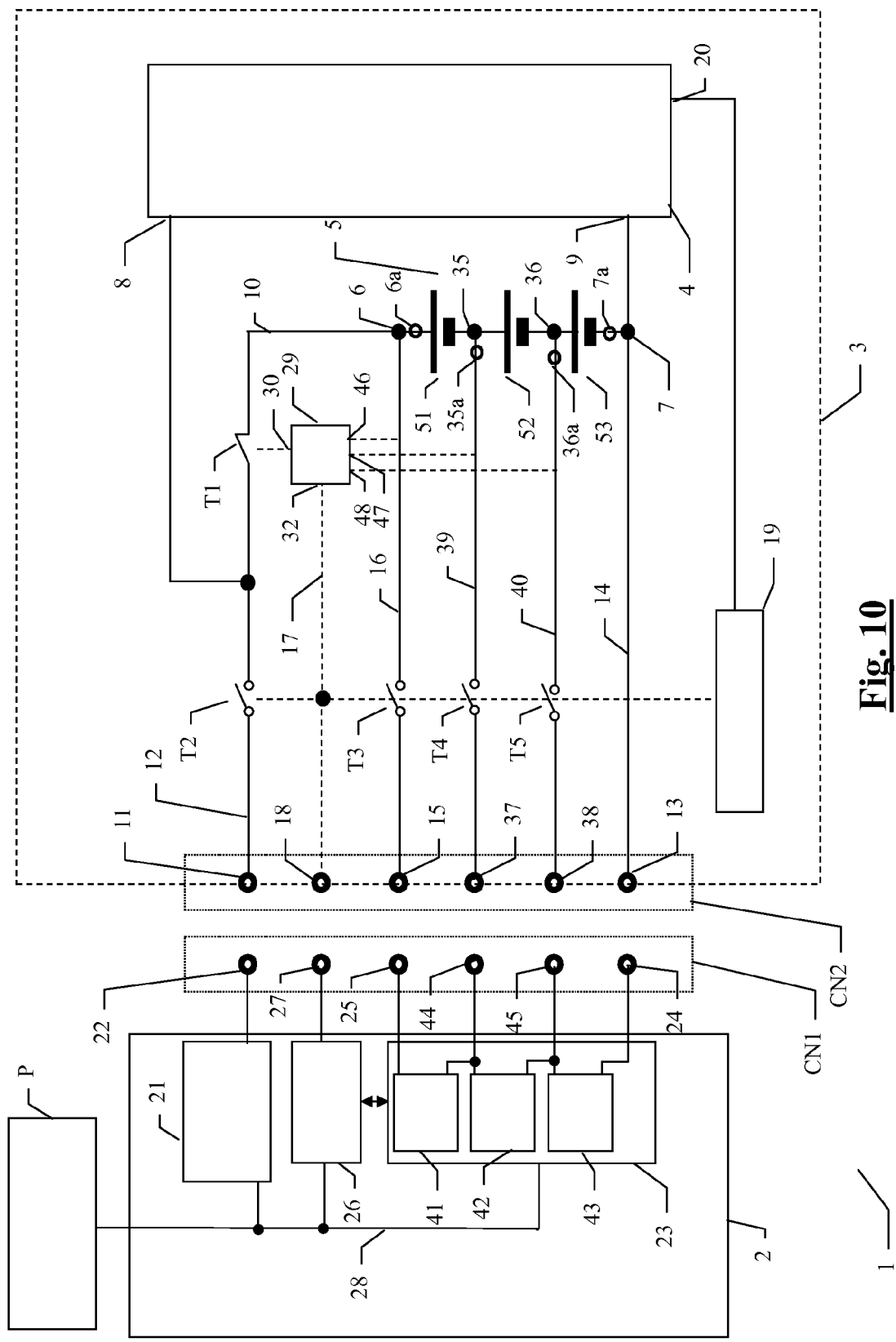
FIG. 10 is a block diagram of a seventh embodiment of the system of the invention.

In particular, as illustrated in FIG. 10, and analogous to the embodiment shown in FIG. 4, there can be a protection circuit 29 having an output 30 for driving the normally closed switch T1, a control input 32 which receives the drive signal generated by the logic unit 26, and three monitor inputs 46, 47, 48 respectively connected with the poles 6, 35, 36 of the battery elements 51, 52, 53 of the power supply unit 5.

The protection circuit 29 detects the voltage at the poles 6, 35, 36 of the battery elements 51, 52, 53 through the monitor inputs 46, 47, 48 and the current delivered by the series connection of the battery elements 51, 52, 53 through the control of the current through the switch T1, which the protection circuit 29 itself drives. With the system in the first operating configuration shown in FIG. 9, wherein the battery power supply unit 5 supplies the electronic device 4, the protection circuit 29 intervenes as to open the normally closed switch T1 when the current of the battery power supply unit 5 or the voltage of one of the battery elements 51, 52, 53 falls outside predetermined values. For example, the protection circuit 29 opens switch T1 in the case of excessive current (e.g., Imax=5 A) or opens switch T1 when the voltage at one of the poles 6, 35, 36 of the battery power supply unit 5 is too low (e.g., Vmin=2.8 volts).

When, on the other hand, the system 1 is in the operating configuration with the battery charger 2 connected with the on-board electronic device 3, analogous to what is shown in FIG. 8, the protection circuit 29 detects the presence of the battery charger 2 by means of the control input 32, and it keeps the normally closed switch T1 constantly open.

It should moreover be noted that, in FIG. 10, removable contacts 6a, 7a, 35a, 36a for connection between the battery power supply unit 5 and the electronic device 4 are illustrated. The battery power supply unit 5 is therefore removable from the on-board apparatus 3, and it could be housed in a casing separate from the casing of the electronic device 4. It is moreover understood that this is also applicable in the embodiment of FIGS. 8 and 9.

Those skilled in the art will understand that several changes, additions, eliminations, and replacements can be made to the above-described embodiments without departing from the scope of protection of the invention, defined by the attached claims.

For example, the normally closed switch T1 could be replaced by a normally open switch or by a two-state switch and/or normally open switches T2, T3, T4, T5, when provided for, could be replaced by normally closed switches or by two-state switches, possibly providing for the logic control unit 26 to be in the on-board electronic apparatus 3 rather than in the battery charger 2, and that the electronic apparatus 3 is possibly equipped with a buffer battery.

Moreover, the logic unit 26 could be absent, for example, providing for magnetically or mechanically driven switches in the on-board electronic apparatus or in the battery charger, respectively, and a magnet or respectively a mechanical actuator in the battery charger, or in the on-board electronic apparatus, respectively, to automatically actuate the switches upon connection of the battery charger 2 to the on-board electronic apparatus 3.

The logic unit 26 for controlling the switches T1 and T2-T5, when provided for, could be part of the on-board electronic apparatus 3.

The battery power supply unit 5 or its single battery elements 51, 52, 53 could be removable from the electronic device 4.

What is claimed is:

1. Method for recharging a battery power supply unit for a bicycle electronic device, comprising the steps of providing electrical energy from an external source to the battery power supply unit and simultaneously and independently, in a non parallel configuration; providing electrical energy from the external source to the electronic device, wherein a parallel configuration is defined as a first terminal of the battery power supply unit and a first terminal of the electronic device being connected to each other, and a second terminal of the battery power supply unit and a second terminal of the electronic device being connected to each other.

2. Bicycle electronic system comprising an electronic device, a rechargeable battery power supply unit and a battery charger having an input for connection with an external energy source, a power supply circuit, and a charge circuit, the system having a non parallel operating configuration wherein the power supply circuit of the battery charger supplies power to the electronic device and the charge circuit of the battery charger charges the power supply unit, wherein a parallel configuration is defined as a first terminal of the battery power supply unit and a first terminal of the electronic device being connected to each other, and a second terminal of the battery power supply unit and a second terminal of the electronic device being connected to each other.

3. System according to claim 2, comprising a further operating configuration wherein the battery power supply unit supplies power to the electronic device.

4. System according to claim 3, wherein in the further operating configuration, the battery charger is electrically disconnected from the battery power supply unit and from the electronic device.

5. System according to claim 4, wherein in the further operating configuration, the battery charger is mechanically disconnected from a casing housing the battery power supply unit and the electronic device.

6. System according to claim 3, further comprising a switch on a power supply line between the electronic device and the battery power supply unit for switching between the operating configuration and the further operating configuration.

7. System according to claim 6, wherein the switch is of a normally closed type and is driven open in the operating configuration wherein the power supply circuit of the battery charger supplies power to the electronic device and the charge circuit of the battery charger charges the power supply unit.

8. System according to claim 2, further comprising at least one switch for insulating power supply lines from the battery charger to the electronic device and/or to the battery power supply unit.

9. System according to claim 8, wherein the at least one insulating switch is of a normally open type and is driven closed in the operating configuration, the power supply circuit of the battery charger supplies power to the electronic device, and the charge circuit of the battery charger charges the power supply unit.

10. System according to claim 6, further comprising a logic unit for driving the switch.

11. System according to claim 8, further comprising a logic unit for driving the at least one insulating switch.

12. System according to claim 10, wherein the driving logic unit is part of the battery charger.

13. System according to claim 11, wherein the driving logic unit is part of the battery charger.

14. System according to claim 3, further comprising a protection circuit suitable for interrupting the supply to the electronic device by the battery power supply unit in the further operating configuration in case the delivered current or at least one voltage of the power supply unit falls outside respective ranges of predetermined values.

15. System according to claim 2, further comprising a sensor for indicating to the electronic device that the system is in the operating configuration wherein the power supply circuit of the battery charger supplies power to the electronic device and the charge circuit of the battery charger charges the power supply unit.

16. System according to claim 2, wherein the battery power supply unit comprises a plurality of battery elements and the charge circuit of the battery charger comprises a corresponding plurality of subcircuits for independently recharging each battery element.

17. System according to claim 2, wherein the rechargeable battery power supply unit is disconnectable from the electronic device.

18. Battery charger comprising an input for connection with an external energy source, a removable connector for connection with an on-board electronic apparatus for a bicycle, a power supply circuit, and a charge circuit, the circuits simultaneously and independently, in a non parallel configuration, providing a voltage for supplying power to an electronic device of the on-board electronic apparatus and a predetermined voltage and/or current for charging a battery power supply unit of the on-board electronic apparatus at terminals of the connector, wherein a parallel configuration is defined as a first terminal of the battery power supply unit and a first terminal of the electronic device being connected to each other, and a second terminal of the battery power supply unit and a second terminal of the electronic device being connected to each other.

19. Battery charger according to claim 18, further comprising a logic unit suitable for providing at a terminal of the connector a signal for driving operating configuration switching means of the on-board electronic apparatus.

20. Battery charger according to claim 18, further comprising switches for insulating the connector terminals.

21. Battery charger according claim 18, further comprising a sensor for detecting a recharging operating condition of the battery power supply unit.

22. Bicycle electronic apparatus, comprising:
at least one electronic device having a first power supply input and a second power supply input;
a rechargeable battery power supply unit having a first pole and a second pole;
a first connection of the first input of the electronic device switchable from the first pole of the battery power supply unit to a first terminal of a removable connector for connection with a battery charger;
a second connection configured to fixedly connect the second input of the electronic device to the second pole of the battery power supply unit and to a second terminal of the connector; and
a third connection of the first pole of the battery power supply unit to a third terminal of the connector.

23. Electronic device comprising:
a first power supply input and a second power supply input;
a first line comprising at least one switch that switches to connect the first power supply input either to a first terminal suitable for connection with a first pole of a battery power supply unit or to a first terminal of a removable connector of the device, the removable connector being configured for connection with a battery charger;
a second line, suitable for connecting the second input to a second terminal suitable for connection with a second pole of the battery power supply unit and simultaneously to a second terminal of the connector;
a third line, suitable for connecting the first terminal with a third terminal of the connector.

24. An electronic apparatus comprising:
at least one electronic device comprising a first power supply input and a second power supply input;
a rechargeable battery power supply unit comprising a first pole, a second pole, and a plurality of common poles;
a first connection of the first input of the electronic device switchable from the first pole of the battery power supply unit to a first terminal of a removable connector for connection with a battery charger;
a second connection of the second input of the electronic device to the second pole of the battery power supply unit and simultaneously to a second terminal of the connector; and a plurality of connections of the first pole and the common poles of the battery power supply unit to respective terminals of the connector.

25. The electronic apparatus according to claim 24, comprising a further operating configuration wherein the battery power supply unit supplies power to the electronic device.

26. The electronic apparatus according to claim 25, wherein in the further operating configuration, the battery charger is electrically disconnected from the battery power supply unit and from the electronic device.

27. The electronic apparatus according to claim 26, wherein in the further operating configuration, the battery charger is mechanically disconnected from a casing housing the battery power supply unit and the electronic device.

28. The electronic apparatus according to claim 25, further comprising a switch on a power supply line between the electronic device and the battery power supply unit for switching between an operating configuration and the further operating configuration.

29. The electronic apparatus according to claim 28, wherein the switch is of a normally closed type and is driven open in the operating configuration wherein the power supply circuit of the battery charger supplies power to the electronic device and the charge circuit of the battery charger charges the power supply unit.

30. The electronic apparatus according to claim 24, further comprising at least one switch for insulating power supply lines from the battery charger to the electronic device and/or to the battery power supply unit.

31. The electronic apparatus according to claim 30, wherein the at least one insulating switch is of a normally open type and is driven closed in the operating configuration, the power supply circuit of the battery charger supplies power to the electronic device, and the charge circuit of the battery charger charges the power supply unit.

32. The electronic apparatus according to claim 30, further comprising a logic unit for driving the switch and/or the at least one insulating switch.

33. The electronic apparatus according to claim 25, further comprising a protection circuit suitable for interrupting the supply to the electronic device by the battery power supply unit in the further operating configuration in case the delivered current or at least one voltage of the power supply unit falls outside respective ranges of predetermined values.

34. The electronic apparatus according to claim 33, wherein the protection circuit comprises a plurality of monitor inputs respectively connected with poles of a plurality of battery elements of the power supply unit.

35. The electronic apparatus according to claim 24, further comprising a sensor for indicating to the electronic device that the apparatus is in an operating configuration wherein the power supply circuit of the battery charger supplies power to the electronic device and the charge circuit of the battery charger charges the power supply unit.

36. The electronic apparatus according to claim 24, wherein the rechargeable battery power supply unit is disconnectable from the electronic device.

37. Battery charger comprising an input for connection with an external energy source, a removable connector for connection with an on-board electronic apparatus for a bicycle, a power supply circuit, and a charge circuit, the circuits simultaneously and independently, in a non-parallel configuration, providing a voltage for supplying power to an electronic device of the on-board electronic apparatus and a predetermined voltage and/or current for charging a battery power supply unit of the on-board electronic apparatus at terminals of the connector, wherein the battery charger comprises a plurality of subcircuits for independently recharging battery elements of the battery power supply unit, wherein a parallel configuration is defined as a first terminal of the battery power supply unit and a first terminal of the electronic device being connected to each other, and a second terminal of the battery power supply unit and a second terminal of the electronic device being connected to each other.

38. A bicycle electronic system comprising:
at least one electronic device comprising a first power supply input and a second power supply input;
a rechargeable battery power supply unit comprising a plurality of battery elements connected in series, a plurality of common poles between pairs of battery elements, and a first pole and a second pole at terminal battery elements;
a battery charger having an input for connection with an external energy source, a power supply circuit, and a charge circuit comprising a plurality of subcircuits for independently recharging each battery element;
a first connection of the first input of the electronic device switchable from the first pole of the battery power supply unit to a first terminal of a removable connector for connection with the battery charger;
a second connection of the second input of the electronic device to the second pole of the battery power supply unit and simultaneously to a second terminal of the connector; and
a plurality of connections of the first pole and the common poles of the battery power supply unit to respective terminals of the connector,
wherein the system has an operating configuration wherein the power supply circuit of the battery charger supplies power to the electronic device and the plurality of subcircuits of the battery charger charges the battery elements.

* * * * *